United States Patent Office 2,803,583
Patented Aug. 20, 1957

2,803,583

AQUEOUS SUSPENSIONS OF PENICILLIN COMPOUNDS EXHIBITING DECREASED CAKING ON STORAGE AND MAINTAINED RESUSPENDABILITY

Karl Petersen and Hans Jacobsen, Copenhagen, Denmark, assignors to Novo Terapeutisk Laboratorium A/S, Copenhagen, Denmark, a limited liability company of Denmark No Drawing. Application October 15, 1953,
Serial No. 386,388

Claims priority, application Denmark October 16, 1952

5 Claims. (Cl. 167—65)

Our invention relates to penicillin preparations and includes among its objects and advantages improvements in the production of penicillin preparations which show increased physical stability during storage, evidenced inter alia by decreased caking on storage and maintained resuspendability on shaking after storage.

It is known that hitherto there has been great difficulty in obtaining sufficient physical stability in aqueous suspensions of procain penicillin in ampoules or vials for injection purposes.

The procaine penicillin preparations on the market are ordinarily indicated to be stable for one year at ordinary room temperature, "stability" being understood to relate primarily to the maintenance of the biological activity of the preparation.

When such suspensions are allowed to stand, a more or less pronounced sedimentation of the procaine penicillin takes place so that after storage the suspensions must be shaken before use. However, within the period of biological stability it very often is found, especially when the suspensions are kept at ordinary room temperature (20 to 25° C.) or at more elevated temperature, that after shaking the suspensions are so viscous that they can only with difficulty be sucked up through the needle of the injection syringe or that the procaine penicillin has formed a cake which does not disappear upon shaking.

This viscosity increase and the cake formation are dependent on the storing temperature. Thus, it has been found that the suspensions become unuseable for therapeutical purposes four times as quickly when stored at 37° C. as when stored at 25° C.

In other words, the preparations will be practically unuseable long before the biological activity of the suspensions has decreased to an extent to make the preparations unuseable from a biological point of view.

Similar considerations apply to aqueous suspensions of other penicillin salts only slightly soluble in water, such as N,N-di-substituted alkylene-diamine penicillins, particularly N,N-di-benzyl-ethylene-diamine penicillin, oxyprocaine penicillin, and 2-chlor-procaine penicillin as well as penicillin esters, such as the hydroiodide of the diethylamino-ethyl ester, and other penicillin compounds slightly soluble in water.

Our invention is based on the observation that it is possible to increase the physical stability of the suspensions by removing substantially all the atmospheric oxygen from the containers in which the suspensions are kept and stored, before, during or after the suspensions have been introduced into these containers. When the aqueous suspensions are stored in the absence of oxygen they maintain their practical utility within the usual period of biological stability. Moreover, it has been found that at the same time a prolongation of the period of biological stability can be obtained.

The reason for the increased physical stability is not known with certainty, but is probably dependent on an increased stability of the penicillin compound present in solution.

In view of the fact that it is known that various antioxidants, such as hydroquinone and ascorbic acid, have no stabilizing effect on aqueous solutions of penicillin compounds, it is surprising that removal of the atmospheric oxygen from the containers, preferably ampoules or vials, in which the aqueous suspensions of the penicillin compounds are kept and stored, results in an increase in the physical stability of these suspensions.

The desired removal of the atmospheric oxygen is in practice most easily obtained by replacing the oxygen with an inert gas or a mixture of inert gases.

As examples of inert gases may be mentioned nitrogen, hydrogen, carbon dioxide, and the inactive (noble) gases, such as helium and argon. Among these inert gases nitrogen is preferred, and among mixtures of inert gases may especially be mentioned a mixture of nitrogen and hydrogen.

Even though our invention may be used in connection with aqueous suspensions of many different penicillin compounds, examples of which have been mentioned above, our invention is nevertheless particularly concerned with an increase in the physical stability of aqueous suspensions of penicillin salts, particularly procaine penicillin, in ampoules or vials for injection purposes, whether these ampoules or vials are all-glass containers, for instance closed by melting, or small bottles, preferably of glass, with a stopper of rubber, plastic or the like.

The production under aseptic conditions of sterile aqueous suspensions of penicillin compounds only slightly soluble in water belongs to the known art. The penicillin compounds are used in crystalline form and it is often the practice to coat the crystals with a non-ionogenic surface-active substance, preferably of the Tween group.

The aqueous suspension medium is given a pH-value between 5 and 7.5, preferably between 6 and 7, and to maintain this pH-range during storage use is made of one more buffering substances, which are active between pH 5 and 7.5. Examples of suitable buffers are citrate and phosphate buffers. Acetate buffer may also be used, but is less suited, because its active pH-range is somewhat too low.

Ordinarily use is also made of viscosity-increasing substances, such as methyl cellulose, CMC, and other cellulose derivatives, dextran, polyvinyl-pyrrolidone and sodium algimate.

Furthermore, it is common practice to add surfaceactive substances, preferably of the non-ionogenic type, such as Tween, Span, and lecithin.

Finally, use is made of preservatives, examples of which are methyl- and propyl-p-hydroxybenzoate.

In an illustrative example the aqueous suspension medium may have the following composition per liter:

24 grams of sodium citrate
1.0 gram of CMC, high visc.
2.0 grams of CMC, low visc.
0.5 gram of Tween 80
1.0 gram of methyl-p-hydroxybenzoate The aqueous suspensions are made by adding the sterile penicillin compound to the sterilized aqueous suspension medium under aseptic conditions, and the suspension is then introduced into sterile ampoules in predetermined amounts substantially smaller than the volume of the ampoules. Usually the ampoules are filled up to two thirds of their volume. Finally the ampoules are sealed.

The concentration of the penicillin compound in suspension is ordinarily such that each milliliter of the suspension contains either 300,000 or 200,000 units.

The aqueous suspensions of procaine penicillin in ampoules produced as outlined above are usually indicated to possess a biological stability of about one year when stored at room temperature (20 to 25° C.), a decrease in the biological activity of about 10% being ordinarily allowed, but tests performed by us have shown that the common commercial preparations have such a low physical stability that after storing at 25° C. for 6 months or less the suspensions, for the reasons indicated above, will be of no practical utility for injection purposes. When using our invention it is possible to keep the suspensions so thin that they are of practical utility for clinical purposes for more than one year.

The replacement of atmospheric oxygen by an inert gas, preferably nitrogen, can be performed at different stages of the production of the penicillin preparations.

According to one embodiment of our invention we effect the replacement between the filling operation and the sealing operation, both of these operations being carried out in a closed chamber. After the filling operation this chamber is successively evacuated and filled with the inert gas or a stream of the inert gas is blown through the suspension under sub-atmospheric pressure until the atmospheric air has been replaced by the inert gas, whereafter the sealing operation takes place under the inert atmosphere.

When ampoules or vials closed by a rubber stopper are used we may also effect the replacement after the filling and sealing operations by piercing a small hollow needle, such as a syringe needle, through the rubber, supplying successively vacuum and the inert gas to the needle and removing the needle. Our tests have shown that the perforation of the rubber when performed with a needle of the size of the common syringe needles does not affect the stability of the preparations during storage.

Alternatively we may also produce suspensions substantially free from atmospheric oxygen by successively evacuating the suspension and supplying the inert gas to the suspension or blowing the inert gas through the suspension, until the atmospheric air has been replaced by the inert gas, and then perform the filling and sealing operations under an inert atmosphere.

When producing suspensions substantially free from atmospheric oxygen as outlined above it is also possible to perform the filling operation after the sealing operation. In such case the atmospheric air is removed from the empty sterile ampoules, which are then sealed with a rubber stopper, whereafter the sealed ampoules are filled by piercing a small hollow needle, such as a syringe needle, through the rubber stopper, supplying the suspension to the needle and removing the needle. If the air in the empty ampoule has been removed by replacing the air with an inert gas so that there is no sub-atmospheric pressure within the sealed ampoule the suspension should be supplied under pressure through the needle.

In order to obtain the best results the ampoules should be sealed in such manner that no detrimental diffusion of air from the exterior into the ampoules takes place during storage. Although we have obtained satisfactory results when using the rubber stoppers available on the market we have found that the physical stability of the suspensions is further improved when using stoppers made from butyl rubber compositions. As far as we know it is novel in the art to use butyl rubber in stoppers for ampoules, and the use of butyl rubber forms, therefore, a part of our invention.

We have performed a series of comparative tests which show the improvements obtainable by the use of our invention. As testing material we have used sterile aqueous suspensions of procaine penicillin in glass ampoules sealed with the ordinary natural rubber stoppers. These ampoules containing about 300,000 units of penicillin per milliliter and having been filled to ⅔ of their volume were stored at different temperatures. Samples of the stored ampoules were taken out for examination at intervals in order to determine the date on which the suspension lost its physical stability, i. e. is unable to be shaken up to form a uniform and injectable suspension.

The results of these tests appear from the table given below.

TABLE I

| Storing Temperature | Period of Physical Stability |
| --- | --- |
| 45° C. | 17 days. |
| 37° C. | 40 days. |
| 25° C. | about 5 months. |

Similar tests have then been performed with the same sort of ampoules, but from which the atmospheric air within the ampoules was removed after sealing by piercing a syringe needle through the rubber stopper and supplying successively vacuum and nitrogen to the needle three times, whereafter the needle was removed. The results of these storing tests are given below in Table II.

TABLE II

| Storing Temperature | Period of Physical Stability |
| --- | --- |
| 45° C. | 23 days. |
| 37° C. | 60 days. |
| 25° C. | 7 months. |

Finally butyl rubber stoppers have been used instead of natural rubber stoppers and the atmospheric air within the ampoules was replaced with nitrogen as described above. The results of the storage tests are given in Table III.

TABLE III

| Storing Temperature | Period of Physical Stability |
| --- | --- |
| 45° C. | 23 days. |
| 37° C. | 100 days. |
| 25° C. | about 12 months. |

Regardless the operation by which the atmospheric air in the ampoules is replaced with nitrogen we would mention that sealed ampoules containing distilled water in the same amount as the suspension and subjected to the same operation showed an oxygen content ranging from 5 to 7% of the original oxygen content, which means that not all the oxygen has been removed from the ampoules containing the procaine penicillin suspension.

Nevertheless the improvement in physical stability is significant, particularly when butyl rubber stoppers are used.

It should finally be remarked that in the above tests use has been made of nitrogen which does not contain oxygen in detectable amounts, and that it is preferred to use nitrogen of this purity.

Although our invention is of particular importance in connection with ampouled penicillin preparations for injection, our invention can also be applied to penicillin preparations for oral use.

Having thus fully described our invention we claim as new and desire to secure by Letters Patent:

1. A stable penicillin preparation exhibiting decreased caking on storage and maintained resuspendability on shaking after storage, which comprises a sealed container, a sterile aqueous suspension of a slightly water-soluble amine addition salt of penicillin within said sealed container, and a substantially oxygen-free atmosphere within said container above the level of the aqueous suspension.

2. A stable penicillin preparation as claimed in claim 1, in which the penicillin salt is procaine penicillin.

3. A stable penicillin preparation as claimed in claim 1, in which the sealed container is an ampoule.

4. A stable penicillin preparation as claimed in claim 1, in which the sealed container is an ampoule sealed with a butyl rubber stopper.

5. An injectable stable penicillin preparation exhibiting decreased caking on storage and maintained resuspendability on shaking after storage, which comprises an ampoule sealed with a butyl rubber stopper, a sterile aqueous procaine penicillin suspension within said ampoule and a nitrogen atmosphere within the ampoule above the level of the aqueous suspension.

References Cited in the file of this patent

UNITED STATES PATENTS

| | | |
|---|---|---|
| 929,610 | Lilly | July 27, 1909 |
| 1,509,916 | Waite | Sept. 30, 1924 |
| 1,947,578 | Bond | Feb. 20, 1934 |
| 2,044,800 | Major | June 23, 1936 |
| 2,051,349 | Goldberg | Aug. 18, 1936 |
| 2,314,527 | Taylor | Mar. 23, 1943 |
| 2,473,339 | Kirchmeyer | June 14, 1949 |
| 2,504,482 | Goldman | Apr. 18, 1950 |
| 2,531,367 | Sprague | Nov. 21, 1950 |

OTHER REFERENCES

Drug Trade News, Jan. 22, 1951, p. 38, "Penicillin sterilized by ethylene oxide."